Feb. 11, 1941.    H. R. CLARK    2,231,798
FISH NET
Filed April 24, 1940
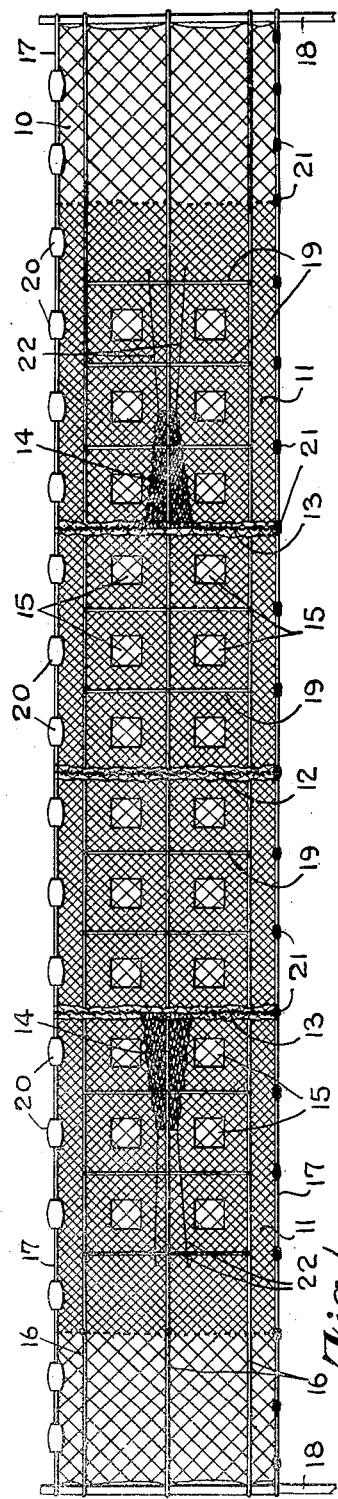
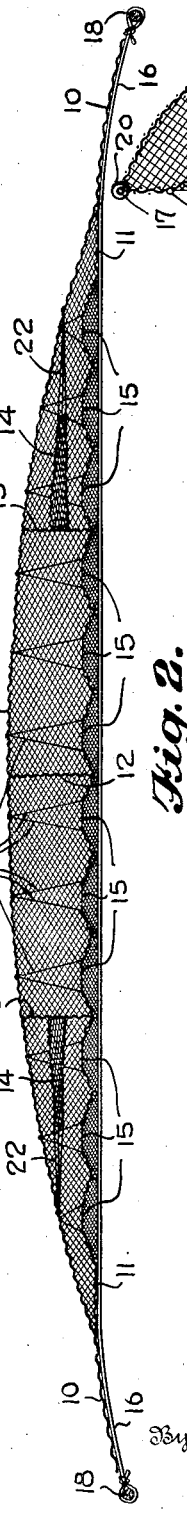
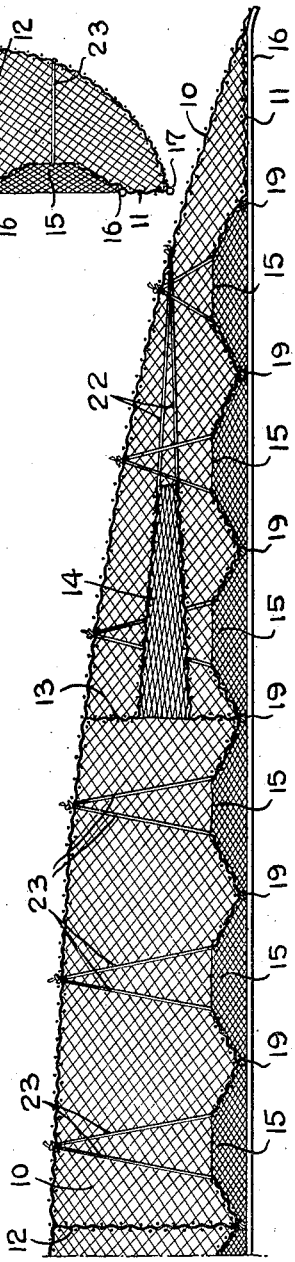
Inventor
Harry P. Clark
By H. Yates Dowell
Attorney Patented Feb. 11, 1941

2,231,798

UNITED STATES PATENT OFFICE 2,231,798

FISH NET

Harry R. Clark, New Hope, Ala., assignor of one-third to A. H. Butler, New Hope, Ala.

Application April 24, 1940, Serial No. 331,476

4 Claims. (Cl. 43—100)

This invention relates to a fish net, and more particularly to a net which can be used to catch fish in large quantities in different bodies of water, including still or running water.

Heretofore nets of various kinds have been used with the ever present problem of determining the proper size of twine or cord employed in forming the mesh, the usual practice being to provide a net with the weakest part sufficient to withstand all the stress or strain to which the net was to be subjected. This resulted in a proportionately heavy structure and even then where large hauls were made concentration of force or strain frequently resulted in breaking the net, thus releasing all the fish.

It is an object of the invention to provide a net of simple construction capable of being secured in operative position to stakes or the like in more or less fixed position or adapted to be dragged through water for catching fish, and a net so constructed that the weight or force of the haul will not be concentrated in any particular area but will be distributed in the net, thereby distributing the stress and strain. It is a further object of the invention to provide means for preventing the loss of all the fish, should a portion of the net be broken, the fish in that particular area only being lost.

Other objects and the nature and advantages of the invention will be apparent from the following description taken in conjunction with the accompanying drawing, wherein:

Fig. 1 is a front view of a net in accordance with the present invention fastened to stakes in operative position;

Fig. 2, a horizontal section;

Fig 3, an enlarged horizontal section of a portion of the net; and

Fig. 4, a vertical section.

In carrying out the invention a net is provided, which consists generally of a plurality of compartments for retaining fish therein, for purpose of illustration four such compartments being shown. However, it is to be understood that the number of compartments and the length and width of the same, or in other words the size of the net, is dependent upon the use to which the net is to be put. Also, the size of the cord or twine of which the net is fabricated and the size of the mesh is likewise dependent upon the use to which the net is to be put.

Each of the compartments is provided with one or more passages or throats affording access of the fish into the net. For purposes of illustration each compartment is provided with three upper and three lower entrances or throats which have been found satisfactory in use, the four compartments having a total of twenty-four such passages.

The four compartments are defined by three partitions, one center and two side partitions. The side partitions are provided with passages, and in order that the fish may only travel through said passages towards the end of the net from the more centrally located compartments the passages are defined by tapered or funnel-shaped portions. The center partition does not have a passage for the first therethrough.

Referring to the drawing, a substantially rectangular netting 10 is provided to form the rear of the net. To this is attached a shorter, narrower netting 11, the connection being at the extremities and sides of the same to thereby provide a single elongated compartment or chamber which is sub-divided by a central partition 12, and side partitions 13, defining four compartments. The center partition serves to prevent the fish from passing the same from one compartment to another, while the end partitions are provided with elongated outwardly extended throats or passages which permit the fish to pass from the compartments adjacent the center partition outwardly into the end compartments, thereby immediately and continually distributing both the haul weight of the fish and the consequent stress and strain upon the net evenly or substantially so throughout the length of the net.

The partitions 12 and 13 determine the relative position or spacing of the front and rear portions of the netting and reinforce the net. The front member 11 is provided with entrance portions or throats 15 of which there are twenty-four, six to each compartment, three over three.

The net may be of the nonrigid type and may be used as a drag net or, as illustrated, a set net. When used as a set net, supporting and reinforcing strands 16 and 17 are attached to stakes 18. These strands extend throughout the length of the net and serve to keep the net in proper position for catching fish. The strands 17 are taut and thus maintain the front of the net likewise taut in upright position with the entrance portions or throats 15 spread so that fish may pass through them. Cross strands 19 serve to tie together the longitudinal strands 16.

The upper and lower strands 17 are provided respectively with spaced floats 20 and sinkers or weights 21 for maintaining the net in properly spread substantially vertical position.

The laterally extended throats 14 are held in extended position by means of strands 22 and the front entrances or throats 15 are kept in proper expanded relation by means of strands 23 engaging the rear of the net.

It will be readily understood that a net in accordance with the present invention is of lightest weight possible commensurate with the uses to which it is to be subjected and that due to the compartments or pockets, the load of fish is distributed along the length of the net and accordingly the net is not subjected to extraordinary stresses or strains. Likewise if the net is damaged, only the fish in that particular compartment or pocket are lost.

It will be obvious to those skilled in the art that various changes may be made in this device without departing from the spirit of the invention, and therefore the invention is not limited to what is shown in the drawings and described in the specification but only as indicated in the appended claims.

What is claimed is:

1. A load-distributing fish net of the non-rigid type comprising a rear wall member and a front wall member defining an enclosure, partition means dividing said enclosure into central and side compartments, said central and side compartments having frontal entrance means adapted to admit the catch directly into said central and side compartments throughout the length of said net, a common side wall of said central compartments being closed to the passage of any portion of the desired catch, the side walls of the side compartments adjoining the central compartments being provided with passage means adapted to permit the travel of the catch therethrough to adjoining side compartments of said net, said passage means being adapted to restrain the return of the catch therethrough, whereby the load of the catch will be distributed throughout the effective area of the net.

2. The combination of claim 1 including supporting strands extending lengthwise from end to end of the net in spaced relation and maintaining the front of the net in upright operative position, weights spaced along the lower portion of the net, floats spaced along the upper portion of the net, the rear portion of the net being relatively full in proportion to the front portion, said partition means connecting the front and rear and top and bottom portions of the net and reinforcing and maintaining the parts in proper relation, and strands maintaining the entrance portions of the net normally toward the interior of the compartments.

3. The combination of claim 1 including longitudinal strands supporting one side of the net in a substantially vertical plane, the remaining portion of the net adjacent said side being relatively full to provide space for fish within the net, floats along the upper portion of the net, and sinkers along the lower portion of the net.

4. The combination of claim 1 including means for supporting the net with its front portion in upright position, said means comprising strands extending longitudinally of the net and other strands extending transversely between the longitudinal strands, said longitudinal and transverse strands defining said entrance means for affording access into the interior of the net substantially throughout its length and said partition means extending from front to back of the net between certain of said entrance means.

HARRY R. CLARK.